United States Patent [19]
Yang et al.

[11] Patent Number: 5,574,511
[45] Date of Patent: Nov. 12, 1996

[54] BACKGROUND REPLACEMENT FOR AN IMAGE

[75] Inventors: Yibing Yang, Arlington; F. Richard Soini, Sudbury, both of Mass.

[73] Assignee: Polaroid Corporation, Cambridge, Mass.

[21] Appl. No.: 544,615

[22] Filed: Oct. 18, 1995

[51] Int. Cl.⁶ .................................................. H04N 9/74
[52] U.S. Cl. ......................... 348/586; 348/590; 348/591
[58] Field of Search ..................................... 348/586, 587, 348/588, 590, 591, 592, 598, 164, 162; 382/190, 195; 352/49, 89, 46, 48; H04N 9/74

[56] References Cited

U.S. PATENT DOCUMENTS

| | | | |
|---|---|---|---|
| 4,751,571 | 6/1988 | Lillquist | 348/164 |
| 4,967,276 | 10/1990 | Murakami et al. | 348/164 |
| 5,001,558 | 3/1991 | Burley et al. | 348/164 |
| 5,386,242 | 1/1995 | Chaplin . | |
| 5,400,081 | 3/1995 | Chaplin . | |

FOREIGN PATENT DOCUMENTS 07160869  6/1995  Japan .

*Primary Examiner*—Michael H. Lee
*Attorney, Agent, or Firm*—Robert A. Sabourin

[57] ABSTRACT

The present invention is useful in taking images for identification and other purposes without the requirement of a photobooth, regardless of the background of the image. The original background of the image is replaced with a preselected background. Two IR images with different intensities of IR illumination in the foreground and background regions of the scene, respectively, are compared for light intensity differences between corresponding pixels of the two images to form a mask differentiating between the foreground and background regions of the image. The mask is then applied to a visible light image of the scene and the preselected background is used to replace the original background.

32 Claims, 2 Drawing Sheets

BACKGROUND REPLACEMENT FOR AN IMAGE

BACKGROUND OF THE INVENTION

This invention relates to an improved system and method for replacing the background of a digitally captured image record.

Photographic scenes and their images may be divided into distinct parts on the basis of their importance to overall scene content. In every scene there is usually some part that represents the subject of major interest with the remaining pans providing context. Generally, parts in the foreground of a scene usually predominate over background parts, but this is not always so because there are obviously those cases where the background conveys information vital to an overall understanding of a scene's full information content. However, there are kinds of scenes where the background is really of little significance and may even detract from the foreground. Most of these involve scenes populated by one or more nearby humans where the backgound could be dispensed with altogether or otherwise rendered unobtrusive. Official settings demanded for passports, identification badges, and drivers licenses are but a few examples of this type of scene which are contrived to eliminate any influence a background may have on the subject.

To have an "official" photograph made typically requires a specially designed and lighted setting in a studio or photography shop. Here, a neutral featureless background is supplied to provide a uniform field against which the subject's face or upper body is photographed. While this procedure is not generally inconvenient, it is not as convenient as being photographed at a booth or kiosk designed for autophotography, where one can take one's own photograph.

With traditional autophotographic devices, the background and illumination of the studio setting is usually mimicked but without the disadvantage of relying on a professional photographer to take the actual "picture". More recently, autophotographic devices have been advocated which allow a subject to be photographed against some ambient background that can change, thus eliminating the need for providing a real controlled background. Instead, it is proposed that the scene be imaged, the foreground and background separated, and the original background replaced by a preferred one suitable for the official purpose at hand—all to be done via digital image processing techniques. Afterwards the new image may be reproduced in hard copy form.

One example of conventional background replacement is disclosed in U.S. Pat. No. 5,400,081 issued Mar. 21, 1995 to Chaplin, where a chroma key control signal is used for background suppression and new background shaping. Suppression is accomplished by constructing a vector for the imperfect color background scene with a hole in it where the foreground subject is located. The vector is constructed by scaling the vectors for the imperfect color background by the chroma key control signal in mixer circuits for luminance and chrominance components, respectively. The outputs from the mixers are subtracted from the video signal so that only the foreground signal remains.

Although the above and other methods of background replacement are known in the art of electronic digital image processing, none of the known methods discloses or suggests the novelty of the inventive method and system as disclosed and claimed herein. Consequently, the primary object of the present invention is to provide a novel method and system for background replacement of a digitally captured image. This and other objects will become apparent in view of the following descriptions, drawings and claims.

SUMMARY OF THE INVENTION

The present invention is useful in taking images for identification and other purposes without the requirement of a photobooth, regardless of the background of the image. The original background of the image is replaced with a preselected background. Two IR images with different intensities of IR illumination in the foreground and background regions of the scene, respectively, are compared for light intensity differences between corresponding pixels of the two images to form a mask differentiating between the foreground and background regions of the image. The mask is then applied to a visible light image of the scene and the preselected background is used to replace the original background.

BRIEF DESCRIPTION OF THE DRAWINGS

The aforementioned aspects and other features of the invention are described in detail in conjunction with the accompanying drawings in which the same reference numerals are used throughout for denoting corresponding elements and wherein.

DETAILED DESCRIPTION OF THE PREFERRED EMBODIMENTS

Figure 1:
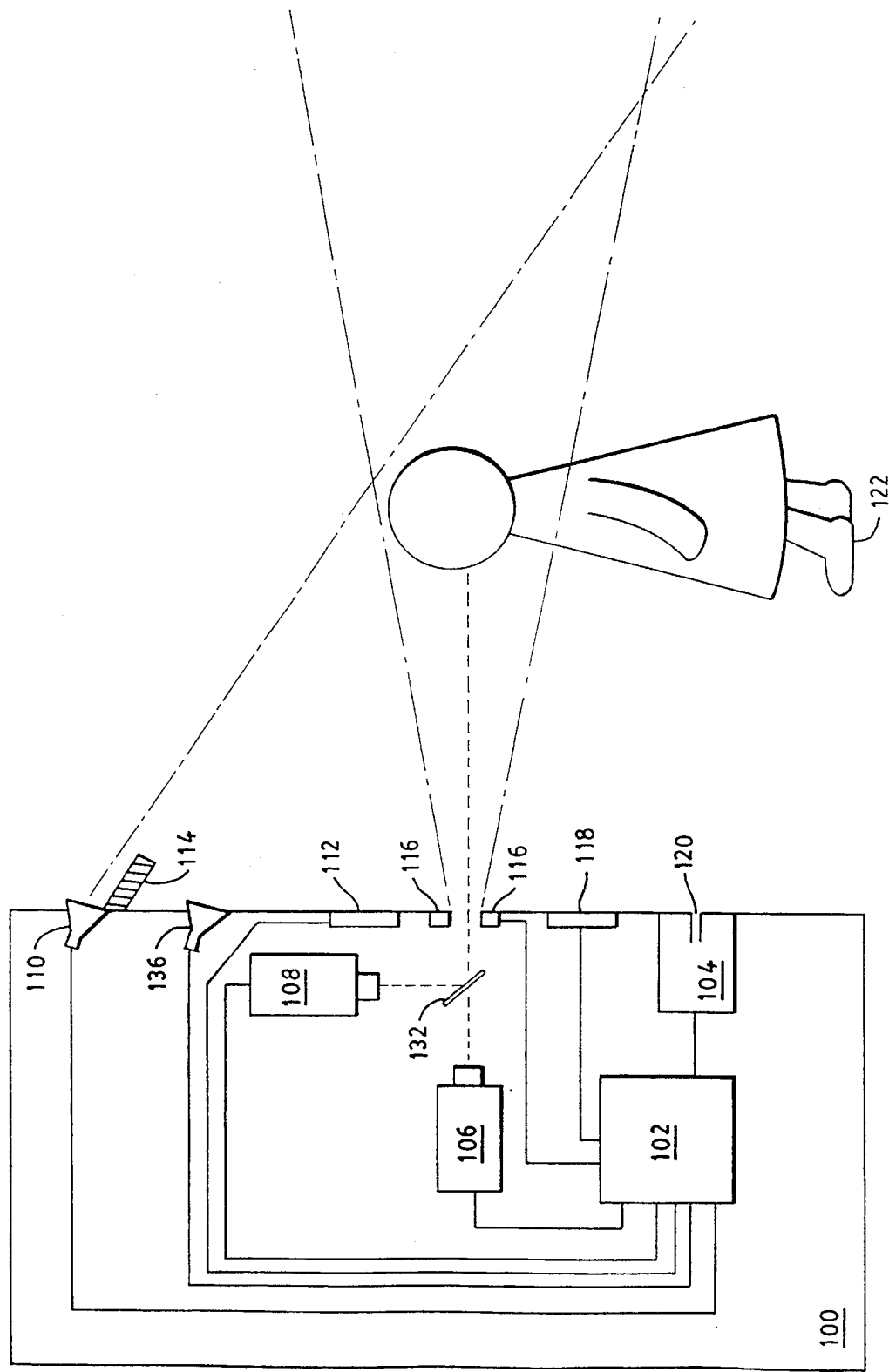
FIG. 1 is a diagrammatic representation of a photo unit 100 which includes the background replacement system of the current invention.

The following description is provided to enable any person of ordinary skill in the art of electronic digital image processing to make and use the present invention. The description sets forth the best mode contemplated by the inventors for carrying out their invention. Various modifications are readily apparent to those skilled in the art, in accordance with the generic principles of the invention as defined herein.

In order to more fully appreciate the invention as claimed, certain key words; are defined for clarity. An image of a scene can be segmented into a foreground, a near background and a far background. The foreground includes objects near the imaging device which are the subject of the image, often a person. An active light source is a lamp that is used for supplying light to the scene. The near background is the part of the background which can be affected by an active light source, whereas the far background is the part of the background which can not be affected by an active light source. For instance, if a person is being photographed with a mountain range in the distance, an active light source will not affect the lighting on the mountain range, i.e. the far background. If however, a bush stands a few feet behind the subject within the range of the active light source, that bush is located in the near background. The terms background illumination and background lighting refer to the near background of a scene being illuminated by one or more active light sources typically directed by baffles in addition to any ambient illumination. The foreground is not illuminated by the active background lighting.

Similarly, the terms foreground illumination and foreground lighting refer to the foreground or subject of an image being illuminated by one or more active light sources typically directed by baffles in addition to any ambient illumination. The background is not illuminated by the active foreground lighting. The terms front lighting or front illumination refer to the case where one or more active light sources are positioned near the optical axis of the imaging device to illuminate the subject of the image. The line of demarcation is defined as the line of pixels that separates the foreground and background regions of a digital image. Two digital imaging devices have the same virtual spatial location when the images taken by the devices are identical. A digital imaging device includes any device which uses a CCD (charge-coupled device) such as, but not limited to, an electronic camera or a camcorder.

In the present invention, an original background of a digitally captured image is replaced with a predetermined replacement background by comparing lighting characteristics between pixels of the image. One of the lighting characteristics that can be considered is light intensity. Another is the contrast ratio, defined as the ratio of intensity values of pixels at the same, i.e. corresponding, location that are compared between two images of the same scene taken at the same time.

Illuminating the background and foreground regions of the image with lights of different intensities, i.e. different illumination patterns, provides a useful mode of comparison. A comparison of all pixels in the image provides information which can be analyzed to delineate the foreground and background regions of the image. However, several problems do exist.

Measurement of light intensity is directly related to the reflectance of an object from which the light is being measured. For instance, if an object is illuminated with light and exhibits a high reflectance, then most of the light incident to the object is reflected and available for measurement. However, a problem occurs if the object being illuminated has a low reflectance, since only a small amount of the light incident to the object is reflected and available for measurement.

In the present invention, the subject of the image is generally a person. Thus, the hairline of the subject will generally follow the line of demarcation separating the foreground and background regions of the image. It is known that blonde hair exhibits high reflectance and black hair exhibits low reflectance to visible light. Thus when a person having black hair is the subject of an image, the intensity of the reflected visible light incident to the black hair will be small, difficult to measure, and unacceptable for intensity comparisons. On the other hand, light in the IR region of the light spectrum exhibits high reflectance characteristics for both blonde and black hair. Furthermore, the sensitivity of commercially available CCDs includes the near infrared range of approximately 700 to 1000 nanometers. Thus, active light sources in the near infrared range are preferred for intensity comparisons according to the present invention.

The present invention allows an image to be taken regardless of the background of the scene. Thus, a photobooth or backdrop behind the subject is not required. However, a careful analysis of both the active and ambient lighting is in order. For the purposes of the current invention, a scene can be dissected into three regions; a foreground region, a near background region and a far background region. The foreground region includes objects near the imaging device which are the subject of the image, often a person. The near background region is the part of the background which can be affected by an active light source. The far background region is the part of the background which can not be affected by an active light source. For two IR images with different illumination patterns, a comparison of light intensity of pixels at each of the above three regions under varied lighting conditions will provide information necessary for creating a mask for separating the foreground and background regions of an image of the scene. In other words, the contrast ratios of intensity values of pixels at corresponding locations of the two IR images will vary between the foreground and background regions.

Figure 2:
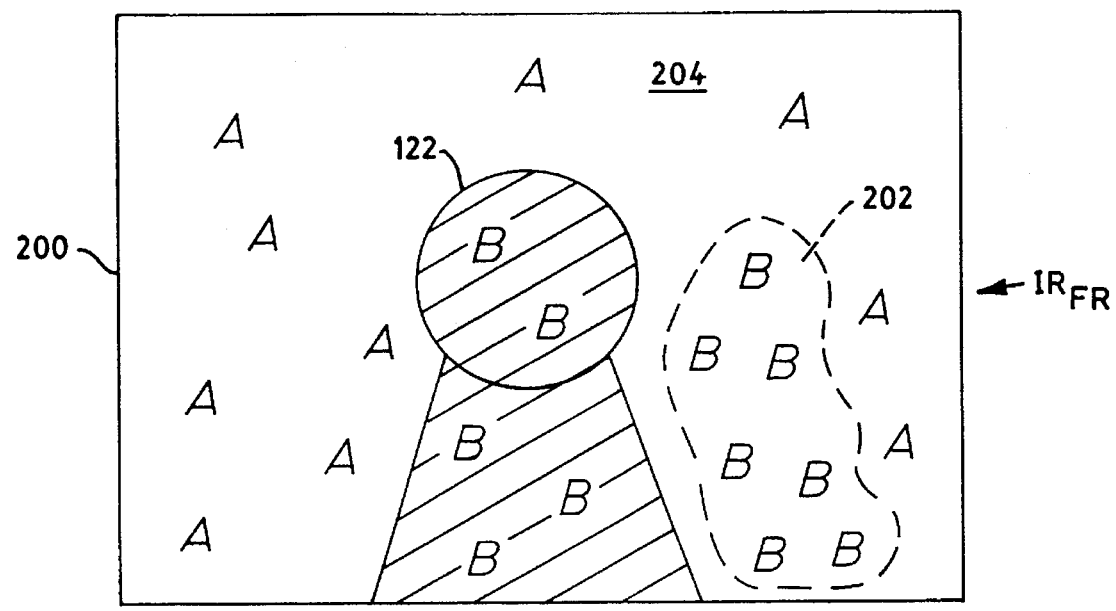
FIG. 2 illustrates a front illuminated IR image of a scene.
Figure 3:
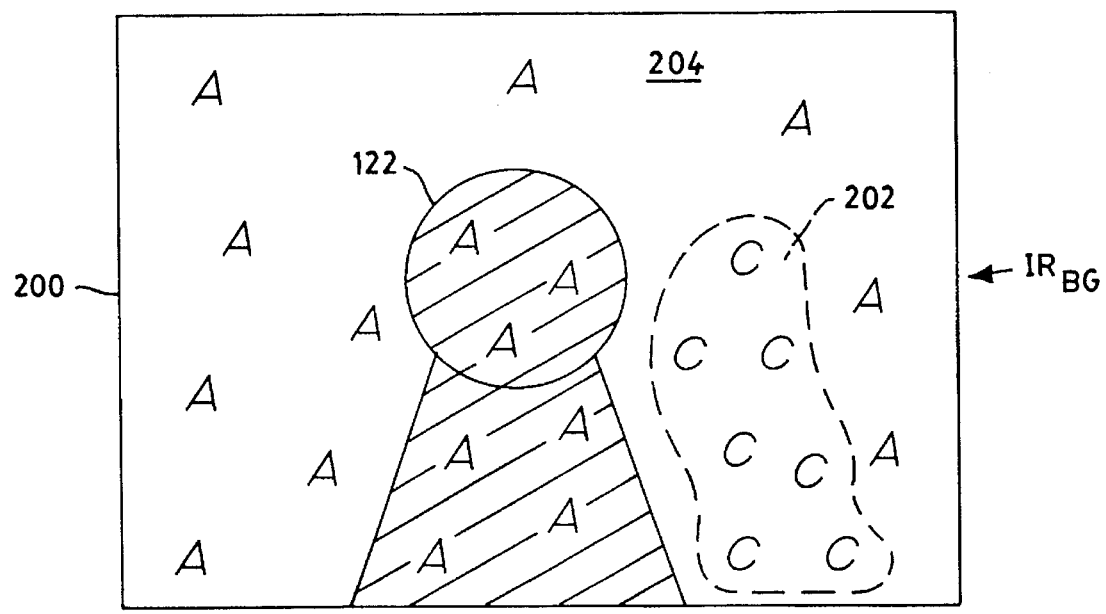
FIG. 3 illustrates a background illuminated IR image of the same scene as FIG. 2.

Two IR images are taken of the same scene under different lighting conditions. The first is a front IR image $IR_{FR}$ illuminated with front infrared radiation as shown in FIG. 2. The second is a background IR image $IR_{BG}$ illuminated with background infrared illumination as shown in FIG. 3. Each image includes a foreground 122 and a background 200 which is further broken down into a near background region 202 having objects which are effected by active light sources, and a far background region 204 having objects which are not effected by active light sources.

FIG. 2 shows the front illuminated IR image $IR_{FR}$ taken with front IR lighting. Of course, ambient (i.e. non-active) IR foreground and background lighting will also be present in some amount for illuminating both the (foreground 202) and the background 200. Only ambient IR light having intensity "A" is reflected at various pixels in the far background since the front IR lighting is incapable of effecting the lighting of the far background. For instance, if the scene is a person standing in a lobby of a large building with a back wall 75 feet away, then the active IR lighting, i.e. the front IR lighting, will not illuminate the far background of the back wall. The front IR light, in combination with the ambient IR light, is capable of illuminating objects in the foreground 122 and the near background 202 at a light intensity "B" which is greater then the ambient IR light intensity "A".

FIG. 3 shows a background illuminated IR image $IR_{BG}$ taken with no active front IR illumination (i.e. only ambient IR lighting is present in the foreground 122) and one or more background IR lights which have been activated to illuminate, in combination with any ambient IR lighting, objects in the near background region 202 of the background 200. Ambient IR light is reflected from pixels in the foreground and far background regions having an intensity of "A", and the background IR lighting combined with the ambient IR lighting is reflected from pixels in the near background region having an intensity of "C" which is greater than the intensity "B" of the front lighting in FIG. 2. For this preferred method, the intensity of the background lighting is greater than the intensity of the front lighting so that the relationships detailed in the following Table I will hold true.

The images $IR_{FR}$ and $IR_{BG}$ are preferably taken with the same IR imaging device in near temporal proximity, limited only by the shutter speed of the IR imaging device and the time necessary to switch the active IR lighting. By taking the two IR images as close together as possible in time, problems created by the movement of the subject or of objects in the near background can be avoided. More specifically, as long as the movement of the line of demarcation between the exposures is not detectable by the human eye, then the movement of the subject is negligible. Typically, a maximum time differential between exposures of about 1/30th of a second (i.e. the shutter speed of an electronic camera) will ensure negligible movement of the subject. Of course, if the subject of the image is stationary, then the two IR images can be taken at any time.

After the two IR images are taken and stored in digital form, they are compared on a pixel-by-pixel basis to create a mask for delineating the foreground from the background. For the present preferred example comparing two IR images, one with front IR illumination and the 2other with background IR illumination, the following; relationships of Table I preside for each corresponding pixel location (i,j) of each image, i and j being integers.

TABLE I

| Foreground pixel | $IR_{FR}$ (i,j) > $IR_{BG}$ (i,j) |
|---|---|
| Far background pixel | $IR_{FR}$ (i,j) = $IR_{BG}$ (i,j) |
| Near background pixel | $IR_{FR}$ (i,j) < $IR_{BG}$ (i,j) |

Thus, if a given pixel in $IR_{BG}$ has a greater intensity at the same pixel location in $IR_{FR}$, then that pixel is identified in the mask as a foreground pixel; if a given pixel in $IR_{BG}$ has the same intensity at the same pixel location in $IR_{FR}$, then that pixel is identified in the mask as a far background pixel; and if a given pixel in $IR_{BG}$ has a lesser intensity at the same pixel location in $IR_{FR}$, then that pixel is identified in the mask as a near background pixel.

A preferred embodiment of the invention, shown in FIG. 1, is a background replacement system incorporated into a photo unit 100 for taking a picture of a subject 122, such as for identification: purposes. The photo unit 100 could be conveniently located, such as at a Post Office, where an original background could be replaced by any desirable preselected background. The subject 122 operates the photo unit 100 via a control panel 118 which is connected to a microprocessor 102. Two imaging devices 106 and 108 having the same virtual spatial location are implemented. Both of the imaging devices 106 and 108 are compatible electronic cameras capable of capturing an image in digital form. Furthermore, one of the imaging devices 108 is capable of capturing an IR image by using an IR pass filter while the other imaging device 106 is capable of capturing a visible light image by using an IR reject filter. The photo unit 100 also includes one or more background IR lights 110 with baffles 114, a front IR light 116, a visible light source 136, a display 112, a beam splitter 132, and a printer 104. The front IR light 116, the background IR lights 110, and the visible light source 136 are all active light sources. The front IR light 116 emits near IR radiation at a first intensity, background IR lights 110 emit near IR radiation at a second intensity greater than the first intensity, and the visible light source 136 emits visible light.

The subject 122 first selects one of a number of replacement backgrounds, then activates the photo unit 100 to begin the photo taking procedure. A preview of the visible light image appears on the display 112 and the user continues by pressing a button to take the two IR and one visible light images. The background IR light 110 is activated to illuminate the near background with near IR light at a first intensity and a background illuminated IR image $IR_{BG}$, as shown in FIG. 3, is taken with the imaging device 108. Within about 1/30th of a second, the background IR light 110 is deactivated, the visible light source 136 is activated, and the front IR light 116 having a second intensity less than the first intensity is activated. At that time, the imaging device 108 takes a front illuminated IR image $IR_{FR}$, as shown in FIG. 2, and the second imaging device 108 simultaneously takes a visible light image. Shortly thereafter the front IR light 116 and the visible light 136 are deactivated.

Each of the components of the photo unit 100 is controlled by the microprocessor 102 as well understood by those skilled in the art. The microprocessor 102 collects and stores records of the first IR image, the second IR image and the visible light image. The difference between intensities at corresponding pixels of the first and second IR images is determined by the microprocessor 102 to form a mask which discriminates the foreground 122 from the background 200 regions of the images. This mask is then applied to the visible light image to create a modified visible light image by replacing the original background with the new preselected background. A print of the modified visible light image can be retrieved from a slot or tray 120 within printer 104.

In the above preferred embodiment the subject 122 is illuminated by a front IR light 116 which is positioned so that every image data point, i.e. pixel, of the subject 122 is illuminated without shadows. Ideally, the front IR light 116 should be located as close as possible to the optical axis of the imaging devices.

The above preferred embodiment of the inventive method and apparatus uses two IR images, one illuminated with front IR lighting and the other illuminated with background IR lighting. This scheme provides the best results for photographing a person and replacing the background. However, many variations exist of the general scheme for comparing light intensities at each corresponding pixel between two images under different lighting conditions. For instance, a different part of the light spectrum can be used to expose the images to be compared or, the order and timing of taking the various images can be changed. Furthermore, the front IR lighting could be replaced with foreground IR lighting. In that particular case, the first IR image would be a foreground IR image $IR_{FG}$ taken using one or more foreground lights directed by baffles to illuminate the foreground of the scene with no background IR illumination other than ambient. The second IR image would be an ambient IR image $IR_{AM}$ taken with only ambient IR illumination in both the foreground and the background. In the ideal case, the pixels of the mask are created by comparing $IR_{FG}$ with $IR_{AM}$ according to Table II for each corresponding pixel location (i,j) of each image, i and j being integers.

TABLE II

| Foreground pixel | $IR_{FG}$ (i,j) > $IR_{AM}$ (i,j) |
|---|---|
| Background pixel | $IR_{FG}$ (i,j) ≤ $IR_{AM}$ (i,j) |

Thus, if a given pixel in $IR_{FG}$ has a greater intensity at the same pixel location in $IR_{AM}$, then that pixel is identified in the mask as a foreground pixel; and if a given pixel in $IR_{FG}$ has the same or lesser intensity at the same pixel location in $IR_{AM}$, then that pixel is identified in the mask as a background pixel.

The imaging devices 106 and 108 are preferably of the color CCD type with a good quality television lens of a desired focal length and filtered to restrict the spectral sensitivity to a desired spectral band. Compatible color video cameras 106 and 108 are preferred whereby one of the cameras is modified with an IR filter to be able to record an IR image. All of the variables for taking a photograph such as the depth of field, focal length, etc. are easily established as necessary by one of ordinary skill in imaging science.

In an experimental setup used for testing the invention at Polaroid's Imaging Science Laboratory, a single imaging device was used for taking both the IR and visible light images of a mannequin. The imaging device consisted of a Philips CM800 black & white NTSC format (640×480 pixels) CCD camera with color separations made using wratten 25 (red), 58 (green) and 47B (blue) filters. Red, green and blue images were individually recorded during testing. Color balance was adjusted using wratten neutral density filters and/or changing the lamp voltage for the three color filter exposures. The camera included a Computar f/1.4 16 mm FL lens with a 1 mm BG18 glass filter for IR rejection and a wratten 87B gel filter for visible light rejection. Digitization was accomplished using a Data Translation DT55-LC frame grabber with 7 bits of quantization.

Whatever infrared camera is used should have a large aperture so that the background in the infrared images will be blurred. To the extreme, the background will appear uniform for both infrared images, but brighter when the background is illuminated. The influx of light can be controlled by using a transparency with an appropriate transmission rate. Most importantly, the infrared camera used should respond sensitively to small light intensity changes when the light is weak.

The foreground illumination for both the visible and near IR ranges in the test system was provided by three tungsten halogen Lowell Pro-Lights, model P1-10 (125 watts, 3200K@120 volts) which were each placed between 1 and 2 feet from the optical axis of the camera 200 and approximately 2.5 feet from the subject. Exposure was controlled by changing the lamp voltage. The background illumination for the appropriate IR image record was provided by three tungsten halogen Lowell Tota-Lights, model T1-10 (500 watts, 3200K@120 volts) with barn doors excluding the background lighting from behind the subject.

It is to be understood that the above described embodiments are merely illustrative of the present invention and represent a limited number of the possible specific embodiments that can provide applications of the principles of the invention. Numerous and varied other arrangements may be readily devised in accordance with these principles by those skilled in the art without departing from the spirit and scope of the invention as claimed.

What is claimed is:

1. A method of replacing an original background of a scene with a predetermined replacement background, said method comprising the steps of:

making a first infrared (IR) image of the scene at a first time with first IR radiation having a first intensity illuminating said original background;

measuring an intensity of IR radiation at each pixel of said first IR image;

making a second IR image of the scene at a second time after deactivating said first IR radiation, by illuminating a foreground of the scene with a second IR radiation having a second intensity less than said first intensity;

measuring an intensity of IR radiation at each pixel of said second IR image;

generating a mask distinguishing said foreground from said original background by comparing the intensities of IR radiation at each corresponding pixel between said first and second IR images;

making a digital visible light image of the scene at said second time by illuminating the scene with visible lighting; and replacing, in said digital visible light image, said original background with said predetermined replacement background to produce a modified version of the digital visible light image by applying said mask to the digital visible light image.

2. The method of claim 1, wherein said second IR radiation originates from a front light.

3. The method of claim 1, wherein said second IR radiation originates from one or more foreground lights.

4. The method of claim 1, wherein said second IR radiation originates from ambient light.

5. The method of claim 1, wherein said first IR radiation originates from one or more background lights.

6. The method of claim 1, wherein said first IR radiation originates from ambient light.

7. The method of claim 1, wherein said first IR radiation and said second IR radiation both have wavelengths ranging from about 700 nanometers to about 1000 nanometers.

8. The method of claim 1, wherein a difference between said first time and said second time is about 1/30th of a second.

9. The method of claim 1, wherein a difference between said first time and said second time approximates a shutter speed of an imaging device used for taking said first IR image.

10. The method of claim 1, wherein a difference between said first time and said second time ensures negligible movement of objects within said scene while taking said first IR, second IR and visible light images so that said images will be in focus.

11. The method of claim 1, wherein both said first and second IR images are taken with a first digital imaging device, said digital visible light image is taken with a second digital imaging device, and said first and second digital imaging devices have the same virtual spatial location.

12. For a digital visible light image of a scene having a foreground and an original background, a method of replacing said original background with a predetermined replacement background, said method comprising the steps of:

illuminating only the original background of the scene with one or more background lights of infrared radiation (IR) having a first intensity by directing the background lights towards the original background;

taking a first IR image of the scene at a first time using a first digital imaging device;

measuring and storing an intensity of each pixel of the first IR image;

turning off the background lights, illuminating the scene with an active visible light source, and illuminating the scene with a front light of IR having a second intensity lesser than said first intensity;

taking a second IR image of the scene at a second time using said first digital imaging device;

measuring and storing an intensity of each pixel of the second IR image;

creating a mask differentiating said foreground from said original background by a pixel-by-pixel comparison between said first and second IR images of said measured intensities;

taking a visible light image at said second time with a second digital imaging device having the same virtual spatial location as said first digital imaging device for generating said digital visible light image; and creating a modified said digital visible light image by applying said mask to said digital visible light image to differentiate said foreground from said original background, and replacing said original background with said predetermined replacement background.

13. The method of claim 12, wherein a difference between said first time and said second time is about 1/30th of a second.

14. The method of claim 12, wherein a difference between said first time and said second time approximates a shutter speed of the first digital imaging device.

15. The method of claim 12, wherein a difference between said first time and said second time ensures negligible movement of objects within said scene while taking said first IR, second IR and visible light images so that said images will be in focus.

16. The method of claim 12, wherein said infrared radiation has wavelengths ranging from about 700 to 1000 nanometers.

17. A system for taking a digital visible light image of a scene comprising a foreground and an original background, and replacing said original background with a predetermined replacement background, said system comprising:

visible lighting for illuminating said scene;

background IR (infrared) lighting for illuminating said original background with IR light having a first intensity;

foreground lighting for illuminating said foreground with IR light having a second intensity lesser than said first intensity;

a first imaging device for taking a first IR image of said scene at a first time when said background lighting is activated and said foreground lighting is deactivated, and for taking a second IR image of said scene at a second time when said background lighting is deactivated and said foreground lighting is activated;

a second imaging device for taking said digital visible light image at said second time when said visible lighting is activated; and a processor for comparing corresponding pixels of said first and second IR images to create a mask differentiating said foreground from said original background in said digital visible light image, then replacing said original background with said predetermined replacement background after applying said mask to said digital visible light image.

18. The system of claim 17, further comprising a beam splitter for redirecting an optical axis of said second imaging device to an optical axis of said first imaging device.

19. The system of claim 17, wherein said visible lighting is ambient light.

20. The system of claim 17, wherein said visible lighting is one or more lamps.

21. The system of claim 17, wherein said background lighting is ambient light.

22. The system of claim 17, wherein said background lighting is one or more lamps.

23. The system of claim 22, further comprising a baffle for directing said background lighting.

24. The system of claim 17, wherein said foreground lighting is a front light.

25. The system of claim 17, wherein said foreground lighting is one or more foreground lights.

26. The system of claim 17, wherein said first and second imaging devices have the same virtual spatial location.

27. Apparatus for digitally replacing part of an image of an original scene with a substitute, said apparatus comprising:

means for illuminating different parts of a scene with different illumination sources which include infrared radiation during a predetermined time interval to create different contrast ratios among the different parts of the scene;

means for acquiring and storing digital images of the scene during said predetermined time interval while subject to illumination from said different illumination sources;

means for processing said digital images to identify the different parts on the basis of the variation in contrast ratios between the images;

means for selecting said substitute for one of said different pans; and means for replacing said one of said different parts with said substitute in one of said digital images corresponding to a preselected one of said different illumination sources and generating a new digital image available for subsequent use.

28. The apparatus of claim 27, wherein said digital images of the scene comprise: a first image having only a background part of the scene illuminated with infrared radiation from a first illumination source; a second image having only a foreground part of the scene illuminated with infrared radiation from a second illumination source; and a third image being illuminated with visible light from a third illumination source.

29. The apparatus of claim 28, wherein said means for illuminating comprises: one or more background IR lamps with baffles for forming said first illumination source; one or more foreground lamps with baffles for forming said second illumination source; and one or more visible light lamps for forming said third illumination source.

30. The apparatus of claim 27, wherein said means for acquiring and storing comprises one or more electronic imaging devices responsive to both visible and infrared radiation and having the same virtual spatial location.

31. The apparatus of claim 27, wherein said predetermined time interval approximates a shutter speed of said means for acquiring and storing said digital images.

32. The apparatus of claim 27, wherein said predetermined time interval will ensure negligible movement of objects within said scene while said digital images are being acquired so that said acquired digital images will be in focus.

* * * * *